United States Patent [19]

Kawamura et al.

[11] Patent Number: 5,010,285
[45] Date of Patent: Apr. 23, 1991

[54] NUMERICAL CONTROL SYSTEM

[75] Inventors: Hideaki Kawamura, Hachioji; Kentaro Fujibayashi, Musashino; Yosato Hitaka, Tokyo, all of Japan

[73] Assignee: Fanuc Ltd., Minamitsuru, Japan

[21] Appl. No.: 425,175

[22] PCT Filed: Mar. 2, 1989

[86] PCT No.: PCT/JP89/00225

§ 371 Date: Oct. 17, 1989

§ 102(e) Date: Oct. 17, 1989

[87] PCT Pub. No.: WO89/08876

PCT Pub. Date: Sep. 21, 1989

[30] Foreign Application Priority Data

Mar. 9, 1988 [JP] Japan ................................ 63-55761

[51] Int. Cl.5 .......................................... G05B 19/18
[52] U.S. Cl. .................................. 318/569; 318/567; 318/571; 364/474.01; 364/513; 364/474.16
[58] Field of Search .................... 318/569, 567, 571; 364/474.01, 513, 474.16

[56] References Cited

U.S. PATENT DOCUMENTS

| | | | |
|---|---|---|---|
| 4,536,849 | 8/1985 | Borisch et al. | 364/474.16 |
| 4,607,327 | 8/1986 | Kishi et al. | 318/569 X |
| 4,631,684 | 12/1986 | Akasofu et al. | 364/474.01 |
| 4,684,862 | 8/1987 | Röhrle | 364/513 |

Primary Examiner—William M. Shoop, Jr.
Assistant Examiner—Saul M. Bergmann
Attorney, Agent, or Firm—Staas & Halsey

[57] ABSTRACT

A numerical control system controls a plurality of axes with a plurality of channels (10, 20, 30). When a machining program for a first channel (10) is interrupted after a single block in response to a single block signal (6), the feeding of commands of a machining program for other channels (20, 30) is held. The machining programs are thereby executed in synchronism with each other. The machining processes are prevented from being unbalanced, and machining interference is avoided.

3 Claims, 2 Drawing Sheets

NUMERICAL CONTROL SYSTEM

TECHNICAL FIELD

The present invention relates to a numerical control system having a plurality of channels, and more particularly to a numerical control system with improved control over a single block mode of operation.

BACKGROUND ART

There have widely been used numerical control systems for controlling a number of axes or spindles with a plurality of channels (functional arrangements). Such numerical control systems include a numerical control system for controlling a four-axis at he having two spindles and two tool rests. A workpiece can be machined at a high speed by the spindles or tool rests. With the multiple-channel numerical control system, when a single block signal is on, the machining program for a channel is interrupted after a single block, the execution of which is first finished, and the machining program for another channel is executed.

Therefore, the execution of the machining program for one channel is stopped, and the execution of the machining program for another channel is continued. As a result, the machining programs for the channels are not synchronized, the workpiece is machined out of balance, and a machining interference occurs.

SUMMARY OF THE INVENTION

In view of the aforesaid problems of the conventional numerical control systems, it is an object of the present invention to provide a numerical control system with improved control over a single block mode of operation.

According to the present invention, the above object can be achieved by a numerical control system for controlling a plurality of axes with a plurality of channels (functional arrangements), comprising single block control means for controlling the channels so that when a machining program for a first channel is interrupted after a single block in response to a single block signal, the feeding of commands of a machining program for other channels is suspended.

At the time the machining program for the first channel is interrupted after a single block, the feeding of commands of the machining program for the other channels is suspended. The machining programs for the channels are therefore held in synchronism with each other.

DESCRIPTION OF THE PREFERRED EMBODIMENT

An embodiment of the present invention will hereinafter be described with reference to the drawings.

Figure 1:
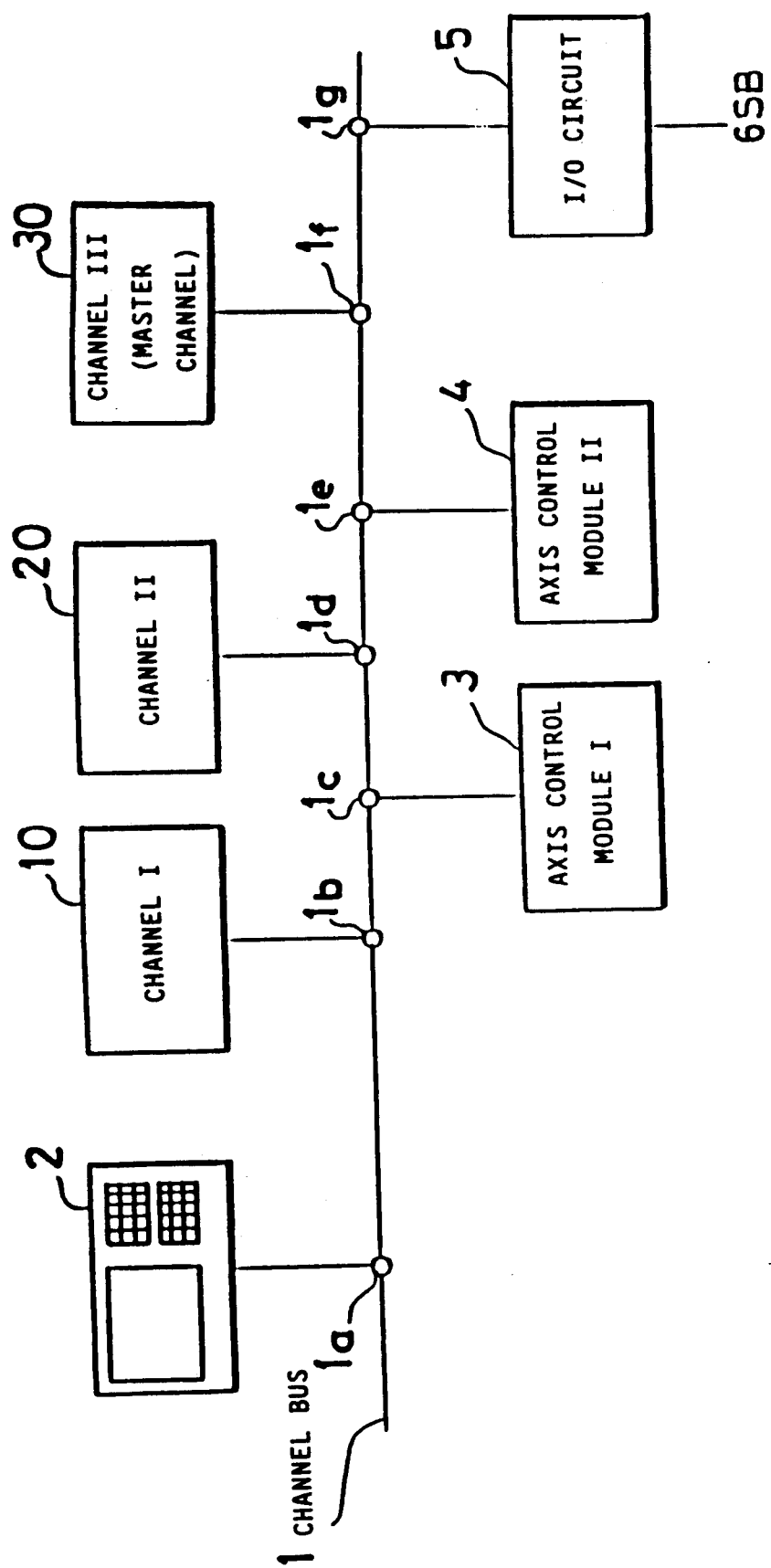
FIG. 1 is a block diagram of a numerical control system according to the present invention.

FIG. 1 shows in block form a numerical control system according to the present invention. A channel bus 1 comprises a multiple-channel master bus interconnecting a plurality of channels. The channel bus 1 has a number slots 1a, 1b, . . . 1g to which the channels (described later) are connected.

A CRT/MDI unit 2 can display data and graphic information for the numerical control system and also receive data from a keyboard thereof. Each of axis control modules 3, 4 can control servomotors for 2 or 3 axes. An I/0 circuit 5 receives and transmits input and output signals. A single block signal 6SB from a control panel is applied to the I/0 circuit 5. Actually, the signals applied to the I/0 circuit 5 are first processed by a PC (programmable controller) contained in the numerical control system, and then transferred to the channels. The PC (programmable controller) is omitted from illustration in FIG. 1.

Each of channels 10, 20, 30 has a function equivalent to the function of a conventional numerical control apparatus. Thus, one channel can read, decode, and execute numerical control commands. Each channel can also control a component such as the CRT/MDI unit 2 or the like. Therefore, each individual channel can process commands for a certain number of axes which a conventional numerical control apparatus has processed.

For example, to control a numerically controlled lathe having two heads, the channel I 10 can control a first spindle, an X1 axis, and a Z1 axis, the channel II 20 can control a second spindle, an X2 axis, and a Z2 axis, and the channel III 30, as a master channel, can perform the control of the entire system for monitoring the other channels, for example. The channel I 10 also controls the CRT/MDI unit 2 through the channel bus 1.

These channels 10, 20, 30 are connected to the channel bus 1 and share their processing operation. If one of the channels runs short of its processing ability, part of the processing operation thereof is transferred to another channel. For example, while the channel I 10 is executing interpolation at very small intervals and the channel II 20 is executing linear interpolation, part of preprocessing operations for the interpolation carried out by the channel I 10 may be executed by the channel II 20. Therefore, the processing abilities of the channels can be balanced so that the processing operation will not be brought out of equilibrium.

The channel III 30 as a master channel performs the control of the entire system such as for determining the priority with respect to use of the channel bus 1 and monitoring the other channels. The channel III 30 can of course control the spindles and axes. If the number of tasks to be processed by the channel III 30 is increased to the point where it can no longer perform the control of the entire system, and any of the other channels still has a processing ability left, then the channel III 30 can transfer its master function to the other channel.

Figure 2:
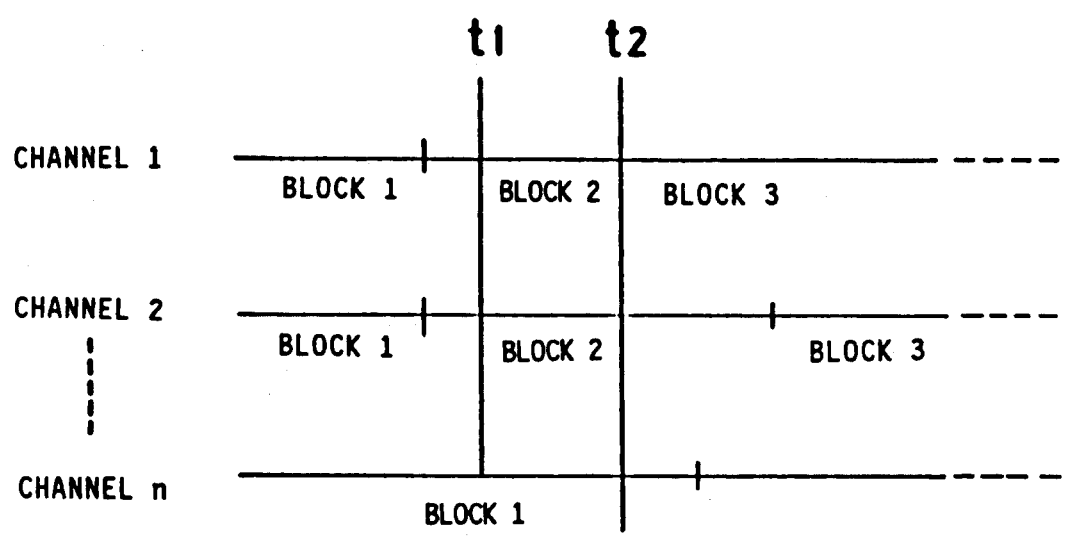
FIG. 2 is a timing chart of operation of the numerical control system.

FIG. 2 shows a timing sequence of operation of the numerical control system. When a single block signal is on at a time t1 while a block 2 of a machining program for the channel 1 is being executed, the machining program for the channel 1 is interrupted in a single block mode of operation at a time t2 after the block 2.

Even while a block 2 of a machining program for the channel 2 is being executed, the feeding of commands of the machining program is suspended at the time t2. The feeding of commands of machining programs for the other channels is also suspended. Therefore, the feeding of commands of the machining programs for all channels is suspended at the time t2.

When a cycle starting button is then pressed, the execution of the machining program for the channels is resumed. As a result, the machining programs for all channels are interrupted and resumed synchronously in the single block mode of operation. Therefore, machining balance is achieved and machining interference is avoided.

In the above description, the single block signal is commonly used by all channels. However, the same control can be performed by applying single block signals to the respective channels. That is, when the machining program for any one of the channels is first interrupted after a single block, the feeding of commands of the machining programs for the other channels is suspended.

With the present invention, as described above, at the time the machining program for one channel is interrupted after a single block, the feeding of commands of the machining programs for other channels is suspended. Consequently, the machining programs for the numerical control system having a plurality of channels can be executed in synchronism, so that the machining process is prevented from being unbalanced and machining interference is avoided.

What is claimed is:

1. A numerical control system for controlling a plurality of axes with a plurality of channels, comprising:
   means for receiving machining programs;
   means for receiving a single block signal;
   means for interrupting a machining program of a first channel in response to said single block signal being received; and
   single block control means for controlling the channels so that when the machining program for the first channel is interrupted, machining programs for other channels are suspended.

2. A numerical control system according to claim 1, further comprising:
   means for providing said single block signal commonly to all of the channels.

3. A numerical control system according to claim 1, further comprising:
   means for providing respective single block signals to corresponding ones of the channels.

* * * * *